United States Patent
Sennoun

(10) Patent No.: US 10,774,741 B2
(45) Date of Patent: Sep. 15, 2020

(54) HYBRID PROPULSION SYSTEM FOR A GAS TURBINE ENGINE INCLUDING A FUEL CELL

(71) Applicant: General Electric Company, Schenectady, NY (US)

(72) Inventor: Mohammed El Hacin Sennoun, West Chester, OH (US)

(73) Assignee: General Electric Company, Schenectady, NY (US)

( * ) Notice: Subject to any disclaimer, the term of this patent is extended or adjusted under 35 U.S.C. 154(b) by 651 days.

(21) Appl. No.: 15/006,445

(22) Filed: Jan. 26, 2016

(65) Prior Publication Data

US 2017/0211474 A1  Jul. 27, 2017

(51) Int. Cl.
  *F02C 6/00*   (2006.01)
  *F02K 3/06*   (2006.01)
  (Continued)

(52) U.S. Cl.
  CPC .............. *F02C 3/305* (2013.01); *B64D 27/24* (2013.01); *F02C 6/00* (2013.01); *F02C 6/206* (2013.01); *F02C 7/00* (2013.01); *F02C 7/12* (2013.01); *F02C 7/36* (2013.01); *F02K 3/06* (2013.01); *H01M 8/00* (2013.01); *H01M 8/0618* (2013.01); *B64D 2027/026* (2013.01); *B64D 2041/005* (2013.01); *F05D 2260/40311* (2013.01);
  (Continued)

(58) Field of Classification Search
  CPC .............. H01M 8/00; H01M 2250/20; H01M 2250/40; B64D 2027/026; B64D 2041/005; Y02T 50/64; Y02T 90/32; Y02T 90/36; F02C 3/305; F02C 6/00; F02C 7/00; F02C 7/36; F02C 6/08; F02C 7/18; F02C 7/185; F02C 9/18; F02C 3/30; F02C 7/143; F02K 3/06; F05D 2260/211
  See application file for complete search history.

(56) References Cited

U.S. PATENT DOCUMENTS 3,404,529 A    10/1968  Lagerström
4,288,983 A *   9/1981  O'Rourke, Jr. ........... F02K 3/06
                                              415/77
(Continued)

FOREIGN PATENT DOCUMENTS

CN        1060741 A    4/1992
CN      101479153 A    7/2009
(Continued)

OTHER PUBLICATIONS

Extended European Search Report issued in connection with corresponding EP Application No. 17151918.4 dated Jun. 7, 2017.
(Continued)

*Primary Examiner* — William H Rodriguez
(74) *Attorney, Agent, or Firm* — Dority & Manning, P.A.

(57) ABSTRACT

An aeronautical propulsion system including a turbine engine having a fan and an electric motor drivingly coupled to at least one of the fan or the turbine engine. The aeronautical propulsion system additionally includes a fuel cell for providing electrical energy to the electric motor, the fuel cell generating water as a byproduct. The aeronautical portion system directs the water generated by the fuel cell to the turbine engine during operation to improve an efficiency of the aeronautical propulsion system.

20 Claims, 4 Drawing Sheets

(51) Int. Cl.
  *F02C 3/30* (2006.01)
  *F02C 6/20* (2006.01)
  *F02C 7/00* (2006.01)
  *B64D 27/24* (2006.01)
  *F02C 7/12* (2006.01)
  *F02C 7/36* (2006.01)
  *H01M 8/00* (2016.01)
  *H01M 8/0612* (2016.01)
  *B64D 41/00* (2006.01)
  *B64D 27/02* (2006.01)

(52) U.S. Cl.
  CPC .......... *H01M 2250/20* (2013.01); *Y02T 50/64* (2013.01); *Y02T 50/675* (2013.01); *Y02T 90/32* (2013.01); *Y02T 90/36* (2013.01)

(56) References Cited

U.S. PATENT DOCUMENTS

| | | | | |
|---|---|---|---|---|
| 5,106,035 | A * | 4/1992 | Langford, III | B64D 27/24 244/53 R |
| 5,417,051 | A | 5/1995 | Ankersmit et al. | |
| 5,722,241 | A | 3/1998 | Huber | |
| 6,050,080 | A | 4/2000 | Horner | |
| 6,349,537 | B1 * | 2/2002 | Newton | F02C 7/32 60/784 |
| 6,794,080 | B2 | 9/2004 | Sennoun | H01M 8/1007 361/502 |
| 7,550,218 | B2 | 6/2009 | Hoffjann et al. | |
| 7,555,893 | B2 | 7/2009 | Okai et al. | |
| 7,767,359 | B2 | 8/2010 | Hoffjann et al. | |
| 7,818,969 | B1 * | 10/2010 | Hotto | H01M 8/0618 60/780 |
| 7,828,244 | B2 | 11/2010 | Heinrich et al. | |
| 7,986,052 | B2 | 7/2011 | Marconi | |
| 8,047,006 | B2 | 11/2011 | Hotto | |
| 9,541,001 | B2 | 1/2017 | Steinwandel et al. | |
| 10,040,566 | B2 * | 8/2018 | Waltner | B60L 50/50 |
| 10,336,461 | B2 * | 7/2019 | Mackin | F01D 25/36 |
| 2003/0072984 | A1 * | 4/2003 | Saloka | H01M 8/04014 429/429 |
| 2003/0230671 | A1 * | 12/2003 | Dunn | B64D 27/24 244/53 R |
| 2004/0040312 | A1 | 3/2004 | Hoffjann et al. | |
| 2004/0177618 | A1 * | 9/2004 | Placko | F02C 3/305 60/775 |
| 2005/0058859 | A1 * | 3/2005 | Goebel | H01M 8/04014 429/415 |
| 2006/0080964 | A1 * | 4/2006 | Youssef | F22B 1/1838 60/772 |
| 2007/0059159 | A1 * | 3/2007 | Hjerpe | B08B 3/02 415/117 |
| 2007/0077459 | A1 * | 4/2007 | Walton, II | H01M 8/04014 429/436 |
| 2007/0179636 | A1 * | 8/2007 | Shige | B60L 11/1861 700/22 |
| 2009/0038867 | A1 * | 2/2009 | Jufuku | B60L 3/0046 180/65.31 |
| 2009/0133380 | A1 | 5/2009 | Donnerhack | |
| 2009/0246584 | A1 * | 10/2009 | Hossain | H01M 4/90 429/408 |
| 2009/0293494 | A1 * | 12/2009 | Hoffjann | B64D 27/02 60/780 |
| 2010/0072318 | A1 * | 3/2010 | Westenberger | B64D 27/02 244/54 |
| 2011/0011096 | A1 | 1/2011 | Edwards et al. | |
| 2013/0036747 | A1 * | 2/2013 | Fuchs | F01D 5/187 60/782 |
| 2013/0147204 | A1 * | 6/2013 | Botti | B64D 27/24 290/1 A |
| 2014/0123666 | A1 * | 5/2014 | Ekanayake | F02C 3/13 60/775 |
| 2015/0007577 | A1 * | 1/2015 | Li | F02C 3/305 60/772 |
| 2015/0112530 | A1 * | 4/2015 | Kim | B60L 11/1887 701/22 |
| 2016/0200447 | A1 * | 7/2016 | Luedders | H01M 8/04761 244/129.2 |
| 2016/0237908 | A1 * | 8/2016 | Snape | F02C 6/08 |
| 2016/0312797 | A1 * | 10/2016 | Suciu | F01D 25/12 |
| 2017/0152765 | A1 * | 6/2017 | Uechi | F02C 7/185 |
| 2017/0225573 | A1 * | 8/2017 | Waltner | B64C 27/12 |
| 2017/0225794 | A1 * | 8/2017 | Waltner | F01D 15/12 |

FOREIGN PATENT DOCUMENTS

| | | |
|---|---|---|
| CN | 101479153 A | 7/2009 |
| CN | 103597643 A | 2/2014 |
| CN | 103597643 A | 2/2014 |
| DE | 10 2013 209538 A1 | 11/2014 |
| DE | 102013209538 A1 | 11/2014 |
| EP | 2 275 656 A2 | 1/2011 |
| EP | 2275656 A2 | 1/2011 |
| JP | 2001-334998 A | 12/2001 |
| JP | 2001334998 A | 12/2001 |
| JP | 2005-038817 A | 2/2005 |
| JP | 2006-205755 A | 5/2006 |
| WO | WO02/38938 A1 | 5/2002 |
| WO | WO2006/079438 A1 | 8/2006 |

OTHER PUBLICATIONS

Machine Translation and Notification of Reasons for Refusal issued in connection with corresponding JP Application No. 2017-003064 dated Feb. 27, 2018.

Office Action issued in connection with corresponding CN Application No. 201710056164.X dated Apr. 3, 2018.

Chinese Opinion for First Examination No. 2018032901944100 dated Apr. 3, 2018.

Second Office Action and Search issued in connection with corresponding CN Application No. 201710056164.X dated Dec. 26, 2018.

European Patent Search 171519184 dated Jun. 7, 2017.

Machine Translation and Notification of Reasons for Refusal issued in connection with corresponding JP Application No. 2017-003064 dated Nov. 6, 2018.

Third Office Action corresponding to Application No. 201710056164.X dated Jul. 25, 2019.

* cited by examiner

US 10,774,741 B2

HYBRID PROPULSION SYSTEM FOR A GAS TURBINE ENGINE INCLUDING A FUEL CELL

FIELD OF THE INVENTION

The present subject matter relates generally to a hybrid aeronautical propulsion system.

BACKGROUND OF THE INVENTION

A gas turbine engine generally includes a fan and a core arranged in flow communication with one another. The core of the gas turbine engine generally includes, in serial flow order, a compressor section, a combustion section, a turbine section, and an exhaust section. In operation, at least a portion of air over the fan is provided to an inlet of the core. Such portion of the air is progressively compressed by the compressor section until it reaches the combustion section. Fuel is mixed with the compressed air and burned within the combustion section to provide combustion gases. The combustion gases are routed from the combustion section through the turbine section to drive one or more turbines within the turbine section. The one or more turbines within the turbine section may be coupled to one or more compressors of the compressor section via respective shaft(s). The combustion gases are then routed through the exhaust section, e.g., to atmosphere.

Due to the relationship between pressure, temperature, and volume for a gas, as the air is compressed by the compressor section, the air progressively increases in temperature. If the temperature of the air reaches a certain threshold temperature during the compression process, the high temperature air may, e.g., interfere with reliable action of the compressor section and introduce lubrication difficulties, in addition to increasing a required amount of work to compress the air to a given pressure. Such may have a detrimental effect on an efficiency of the compressor section. As a consequence, the compressor section of certain gas turbine engines are not operated to their full potential.

Accordingly, a gas turbine engine capable of removing heat from the air being compressed by the compressor section during operation of the gas turbine engine would be useful. More specifically, a gas turbine engine capable of removing heat from the air being compressed by the compressor section during operation of the gas turbine engine without requiring the gas turbine engine to carry a dedicated water tank would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure a gas turbine engine is provided. The gas turbine engine includes a core turbine engine, a fan mechanically coupled to the core turbine engine, and an electric motor mechanically coupled to at least one of the core turbine engine and the fan. The gas turbine engine also includes a fuel cell for providing electrical energy to the electric motor, the fuel cell generating water as a byproduct, the gas turbine engine directing the water generated by the fuel cell to the core turbine engine during operation of the gas turbine engine to improve an efficiency of the gas turbine engine.

In another exemplary embodiment of the present disclosure, an aeronautical propulsion system including a turbine engine is provided. The aeronautical propulsion system includes a fan, an electric motor drivingly coupled to the fan, and a fuel cell. The fuel cell provides electrical energy to the electric motor and generates water as a byproduct. The aeronautical propulsion system directs the water generated by the fuel cell to the turbine engine during operation of the aeronautical propulsion system to improve an efficiency of the aeronautical propulsion system.

In an exemplary aspect of the present disclosure, a method of operating an aeronautical propulsion system including a fan, a turbine engine, an electric motor, and a fuel cell is provided. The method includes providing mechanical power to at least one of the turbine engine or the fan with the electric motor, and providing electrical energy to the electric motor with the fuel cell. The method also includes generating water with the fuel cell as a byproduct of producing electrical energy, and providing the water generated with the fuel cell to the turbine engine of the aeronautical propulsion system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
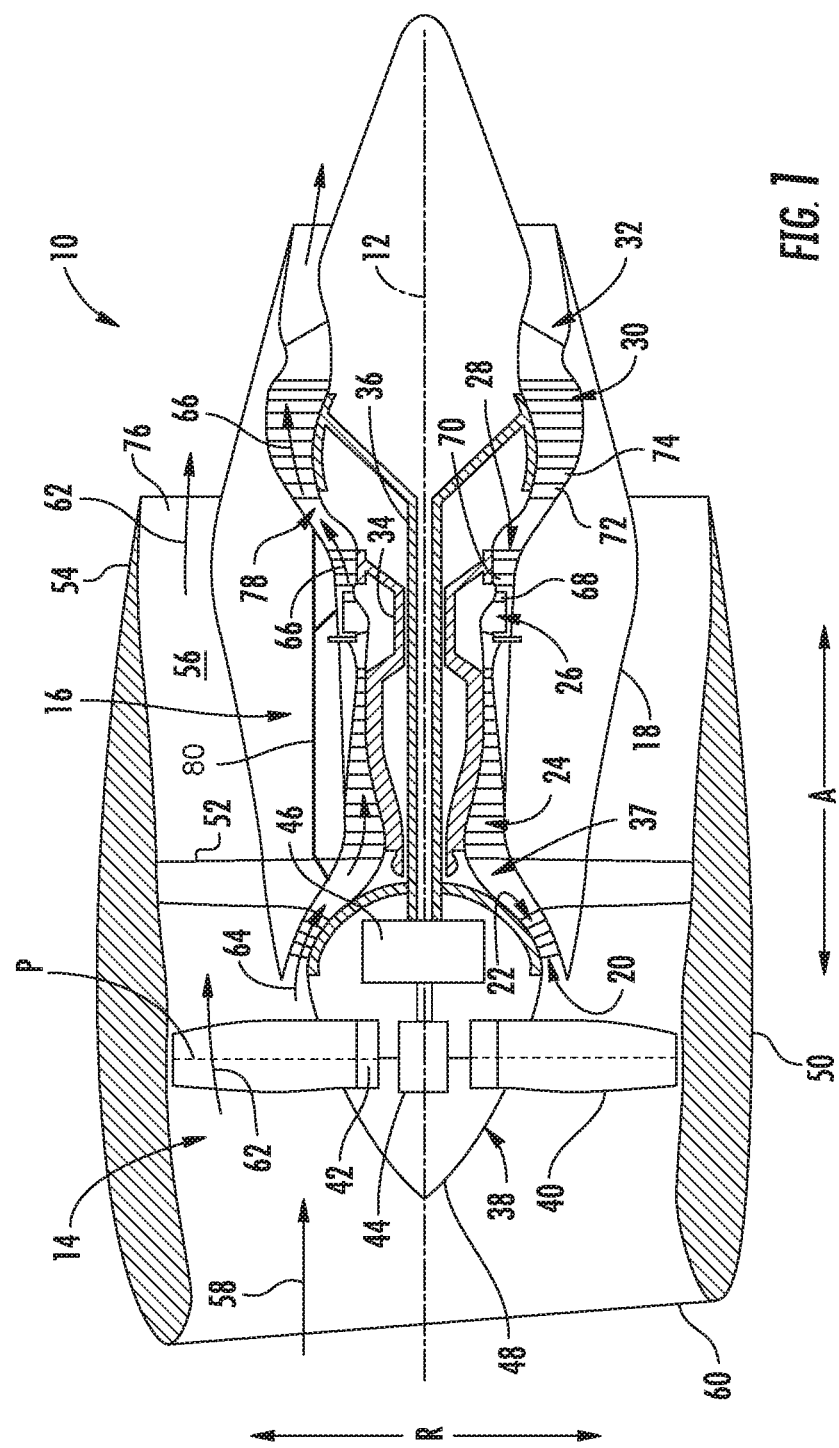
FIG. 1 is a schematic, cross-sectional view of a gas turbine engine in accordance with an exemplary aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. For the exemplary embodiment depicted, the bypass ratio may be at least about 8:1. Accordingly, the turbofan engine 10 may be referred to as an ultra-high bypass turbofan engine. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

The exemplary turbofan engine 10 of FIG. 1 is additionally configured to provide a flow of cooling air from the compressor section to the combustion section 26 and turbine section. More particularly, a flow of bleed air downstream from the LP compressor 22 is directed through a cooling duct 80 to, e.g., the combustor section 26 and the turbine section. Although the exemplary cooling airflow and cooling duct 80 is depicted outward of the core air flowpath 37 along the radial direction R, in other embodiments, the cooling airflow and cooling duct 80 may instead be positioned inward of the core air flowpath 37 along the radial direction R. Additionally, in other exemplary embodiments, the cooling airflow may take air from any other location within the compressor section, such as from the LP compressor 22 or HP compressor 24.

The exemplary turbofan engine 10 depicted in FIG. 1 is configured as an aeronautical gas turbine engine. Aeronautical gas turbine engines, as compared to land-based gas turbine engines, are designed to maximize a power output and efficiency while minimizing an overall weight of the gas turbine engine itself, as well as any required accessory systems.

It should be appreciated, however, that the exemplary turbofan engine 10 depicted in FIG. 1 is provided by way of example only, and that in other exemplary embodiments, the turbofan engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine.

Figure 2:
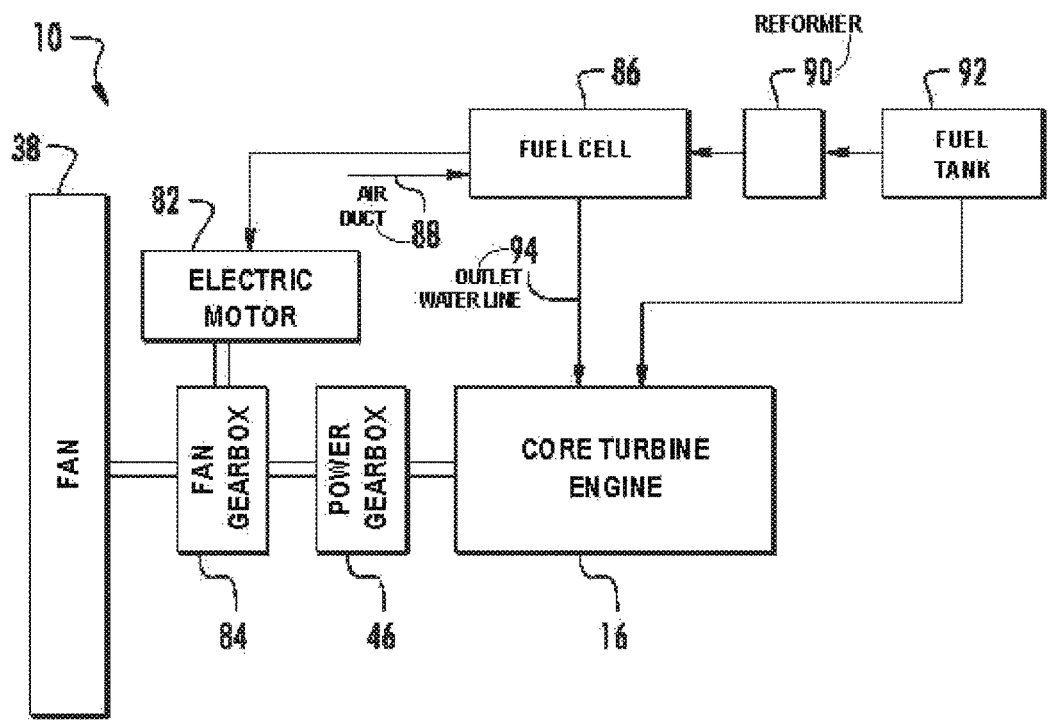
FIG. 2 is a schematic view of a gas turbine engine in accordance with another exemplary embodiment of the present disclosure.

Referring now to FIG. 2, a schematic diagram of an aeronautical propulsion system in accordance with an exemplary embodiment of the present disclosure is provided. For the embodiment depicted, the aeronautical propulsion system is configured as a gas turbine engine, or more particularly, as a turbofan engine 10. As used herein, "gas turbine engine" and "turbofan engine" refer generally to the engine itself, as well as any accessory systems. In certain exemplary embodiments, the turbofan engine 10 may be configured as an ultra-high bypass, geared, ducted turbofan engine 10, similar to the exemplary turbofan engine 10 described above with reference to FIG. 1.

Accordingly, for the exemplary embodiment of FIG. 2, the exemplary turbofan engine 10 generally includes a core turbine engine 16, also referred to herein as simply a turbine engine or core engine, and a fan 38 mechanically coupled to the core turbine engine 16. For the embodiment depicted, the turbofan engine 10 is configured as a geared and ducted turbofan engine, and accordingly includes a power gearbox 46—the core turbine engine 16 being mechanically coupled to the fan 38 through the power gearbox 46—and an outer nacelle assembly (not shown, see FIG. 1) enclosing the fan 38 and at least a portion of the core turbine engine 16.

Referring still to FIG. 2, the exemplary turbofan engine 10 is also configured as a hybrid gas-electric turbofan engine 10. Accordingly, the turbofan engine 10 additionally includes an electric motor 82 mechanically coupled to at least one of the core turbine engine 16 and the fan 38 for at least in part driving at least one of the core turbine engine 16 and fan 38 (i.e., drivingly connected). Specifically, for the embodiment depicted, the electric motor 82 is mechanically coupled to the fan 38 through a fan gearbox 84. The fan gearbox 84 is depicted as being separate and distinct from the power gearbox 46. However, in other exemplary embodiments, the fan gearbox 84 and power gearbox 46 may be combined. Additionally, in other exemplary embodiments, the electric motor 82 may instead be mechanically coupled to the core turbine engine 16, such as to one or both of an LP shaft or an HP shaft (see FIG. 1).

Further, for the embodiment depicted, the turbofan engine 10 includes a fuel cell 86 configured to provide electrical energy to the electric motor 82 during at least certain operating conditions of the turbofan engine 10. Although a single fuel cell 86 is depicted, in other exemplary embodiments, the turbofan engine 10 may include a plurality of fuel cells 86 arranged in a series flow configuration, a parallel flow configuration, or a combination of the two. The fuel cell 86 may receive a flow of air through an air duct 88 and utilize hydrogen (i.e., a hydrogen fuel) to generate electrical energy. The flow of air through the air duct 88 may come from, e.g., a bypass passage 56 of the turbofan engine 10 (see FIG. 1), or any other suitable location. Specifically, the exemplary fuel cell 86 may use hydrogen to generate electricity, typically with a relatively high efficiency, by feeding the fuel cell 86 with hydrogen (or other suitable fuels) and with the oxygen from the flow of air received through the air duct 88. Without limitation, the fuel cell 86 may be a proton exchange membrane fuel cell, a solid oxide fuel cell, a direct methanol fuel cell, an alkaline fuel cell, a molten-carbonate fuel cell, or a phosphoric-acid fuel cell. Alternatively, the fuel cell 86 may be any suitable electrochemical energy conversion device, such as the electrochemical energy conversion device described in U.S. Pat. No. 6,794,080, issued Sep. 21, 2004, which is incorporated herein fully by reference for all relevant purposes.

Referring still to the embodiment of FIG. 2, the exemplary turbofan engine 10 depicted includes a reformer 90 (allowing a fuel other than hydrogen to be used) located upstream of the fuel cell 86 for producing a hydrogen fuel for the fuel cell 86. With such an exemplary embodiment, the reformer 90 may be in flow communication with a fuel tank 92 of a fuel system of the turbofan engine 10, such that the reformer 90 receives a flow of the same fuel utilized with the core turbine engine 16. Specifically, the fuel system may be configured to provide a first flow of fuel from the fuel tank 92 to the core turbine engine 16 and a second flow of fuel from the fuel tank 92 to the reformer 90. The reformer 90 may receive the second flow of fuel from the fuel system and extract the hydrogen compound from such fuel. The reformer 90 may then provide the fuel cell 86 with a flow of hydrogen fuel. Notably, with such an exemplary embodiment, the turbofan engine 10 may be configured to utilize a liquefied natural gas (LNG), aviation turbine fuel (such as Jet A fuel, Jet A-1 fuel), or synthesis gas (i.e., syngas) as its fuel.

As stated, the fuel cell 86 provides electrical energy to the electric motor 82 during at least certain operating conditions, such that the electric motor 82 may in turn provided mechanical power to at least one of the fan 38 and the core turbine engine 16. In certain exemplary aspects, the fuel cell 86 may be configured to provide a substantially constant flow of electric power to the electric motor 82 during a takeoff operating mode and/or a climb operating mode. The takeoff operating mode and climb operating mode may correspond to, e.g., a "full throttle" operating mode wherein an aircraft into which the turbofan engine 10 is installed is taking off or climbing. Additionally, the fuel cell 86 may be configured to provide a substantially constant flow of electric power to the electric motor 82 during other operating modes, such as a cruise operating mode. The cruise operating mode may similarly correspond to an operating mode in which the aircraft having the turbofan engine 10 installed therein is cruising.

Regardless of the operating mode, the fuel cell 86 generates water as a byproduct during operation. Instead of releasing such water generated as a byproduct into, e.g., the atmosphere, the exemplary turbofan engine 10 depicted is configured to utilize such water to increase an efficiency of the turbofan engine 10. Specifically, for the embodiment depicted, the turbofan engine 10 is configured to direct the water generated by the fuel cell 86 to the core turbine engine 16 through an outlet water line 94 during operation to improve an efficiency of the turbofan engine 10, or more particularly, to cool one or more aspects of the turbofan engine 10, or be used as an intercooler fluid between the LP compressor 22 and the HP compressor 24.

Figure 6:
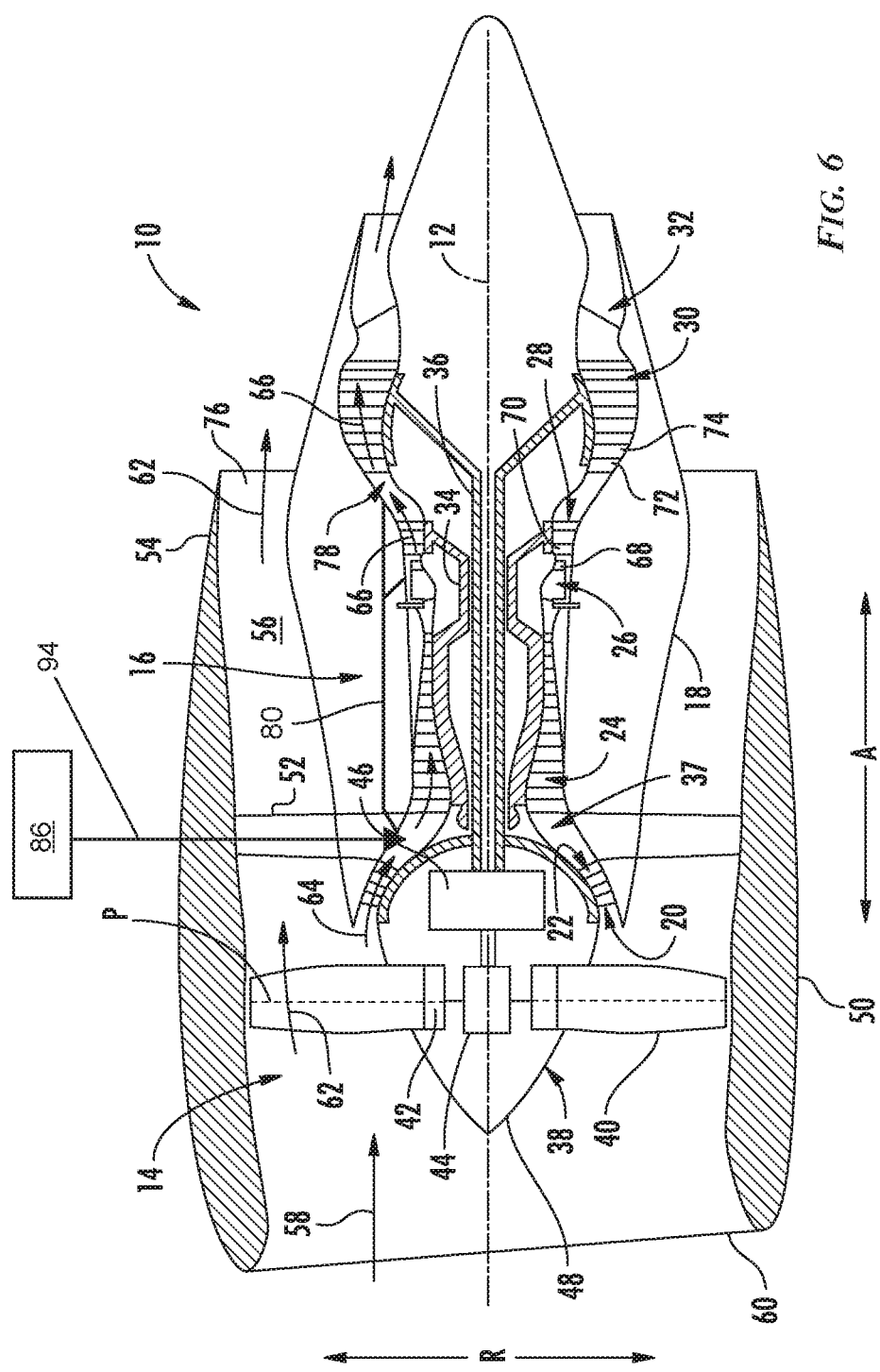
FIG. 6 is a schematic, cross-sectional view of a gas turbine engine in accordance with another exemplary aspect of the present disclosure

In certain exemplary embodiments, the turbofan engine 10 may be configured to direct the water generated by the fuel cell 86 to the core turbine engine 16 through the outlet water line 94 for intercooling the core turbine engine 16. For example, referring briefly to FIG. 6, depicting a turbofan engine 10 in accordance with another embodiment of the present disclosure, the turbofan engine 10 may be configured to direct the water generated by the fuel cell 86 through line 94 to a location between a first compressor (e.g., the LP compressor 22) and a second compressor (e.g., the HP compressor 24). More particularly, the turbofan engine 10 may be configured to inject the water directly into the core air flowpath 37 between the LP compressor 22 and HP compressor 24 to reduce a temperature of the airflow therethrough. With such an exemplary embodiment, the water may reduce a temperature of the air by being consumed/evaporated into the airflow.

Reducing a temperature of the airflow in the compressor section may allow for the airflow to be compressed to a higher pressure while maintaining such airflow below predetermined temperature limits for the various components within the core turbine engine 16. Additionally, reducing a temperature of the airflow in the compressor section may correspondingly reduce an amount of work required to compress such airflow to a desired pressure and further may reduce an amount of NOx emissions. Thus, reducing a temperature the airflow in the compressor section may contribute to an overall efficiency increase of the core turbine engine 16, and particularly of the compressor section.

In other embodiments, however, the turbofan engine 10 may utilize the water generated as a byproduct of the fuel cell 86 operation to increase an efficiency of the turbofan engine 10 in any other suitable manner. For example, in other embodiments, the water may be injected into the core air flowpath 37 at any other suitable location within the compressor section, such as a forward end of the compressor section. Additionally, or alternatively, the water may be circulated through, e.g., one or more stator vanes of the compressor section for cooling an airflow through the compressor section. Further, the water may be provided to, e.g., the turbine section in a similar manner to maintain certain components of the turbine section below predetermined temperature thresholds. Additionally, or alternatively still, the turbofan engine 10 may be configured to direct/inject the water generated by the fuel cell 86 to the flow of cooling air in the cooling duct 80 from the compressor section. For example, the turbofan engine 10 may be configured to direct the water generated by the fuel cell 86 to the flow of cooling air in the cooling duct 80 from the compressor section provided to the combustion section 26 and the turbine section.

It should be appreciated, however, that the exemplary turbofan engine 10 of FIG. 2 is provided by way of example only. For example, in other exemplary embodiments, the turbofan engine 10 may have any other suitable configuration. For example, in other exemplary embodiments, the turbofan engine 10 may not be a geared turbofan engine 10 (i.e., may not include the power gearbox 46 mechanically coupling the fan 38 and the core turbine engine 16), may or may not be a ducted turbofan engine 10 (i.e., may not include a nacelle assembly enclosing the fan 38 and a portion of the core turbine engine 16), and may not be an ultra-high bypass turbofan engine 10 (i.e., may define a bypass ratio of less than about 8:1).

Figure 3:
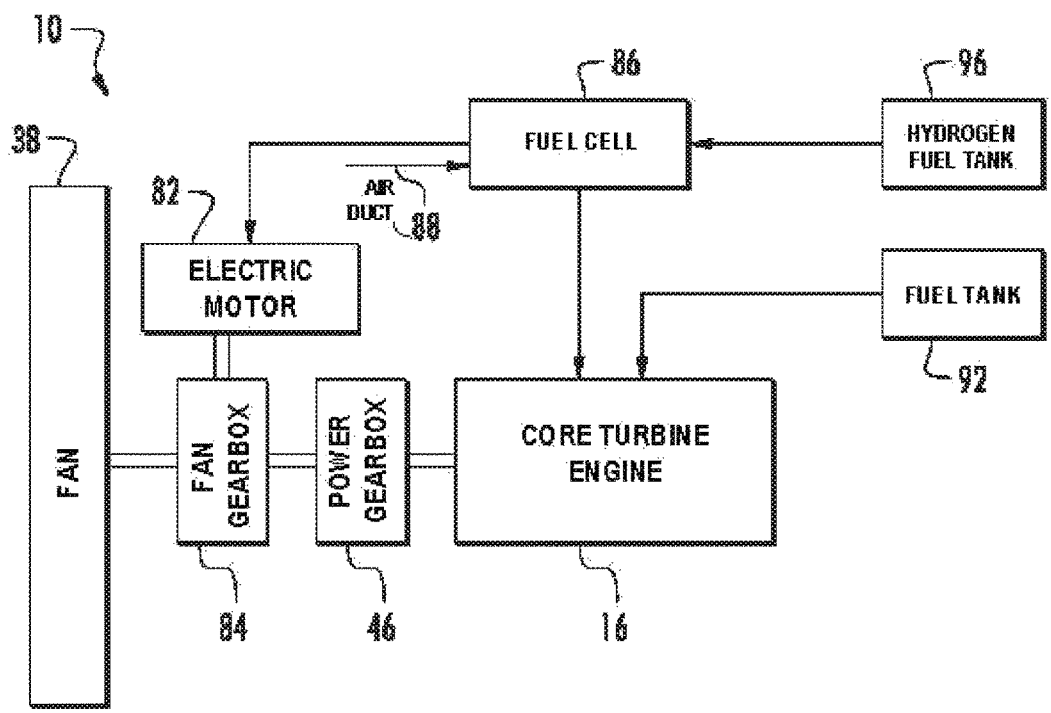
FIG. 3 is a schematic view of a gas turbine engine in accordance with yet another exemplary embodiment of the present disclosure.

Moreover, in other exemplary embodiments, the turbofan engine 10 may be configured to provide the fuel cell 86 fuel in any other suitable manner. For example, referring now to FIG. 3, providing a schematic diagram of a turbofan engine 10 in accordance with another exemplary embodiment of the present disclosure, the turbofan engine 10 may include a separate, dedicated fuel source for the fuel cell 86. Specifically, for the embodiment of FIG. 3, the turbofan engine 10 includes a hydrogen fuel tank 96 for providing hydrogen (i.e., hydrogen fuel) to the fuel cell 86. Accordingly, the exemplary turbofan engine 10 of FIG. 3 does not include a reformer 90 positioned upstream of the fuel cell 86 or in flow communication with a fuel tank 92 of the fuel system (c.f., FIG. 2). The turbofan engine 10 of FIG. 3 may in other respects, however, be configured in a substantially similar manner to the exemplary turbofan engine 10 of FIG. 2.

Further, in other exemplary embodiments, the aeronautical propulsion system may not be configured as a single turbofan or other gas turbine engine. For example, the aeronautical propulsion system may include a plurality of turbofan engines. Or, the aeronautical propulsion system may include a combination of one or more turbofan or other gas turbine engines and one or more other propulsion devices. For example, referring now to FIG. 4, an aeronautical propulsion system 100 in accordance with still another exemplary embodiment of the present disclosure is provided. Specifically, FIG. 4 provides a schematic, top view of an aircraft 102 having the exemplary aeronautical propulsion system 100 integrated therein.

Figure 4:
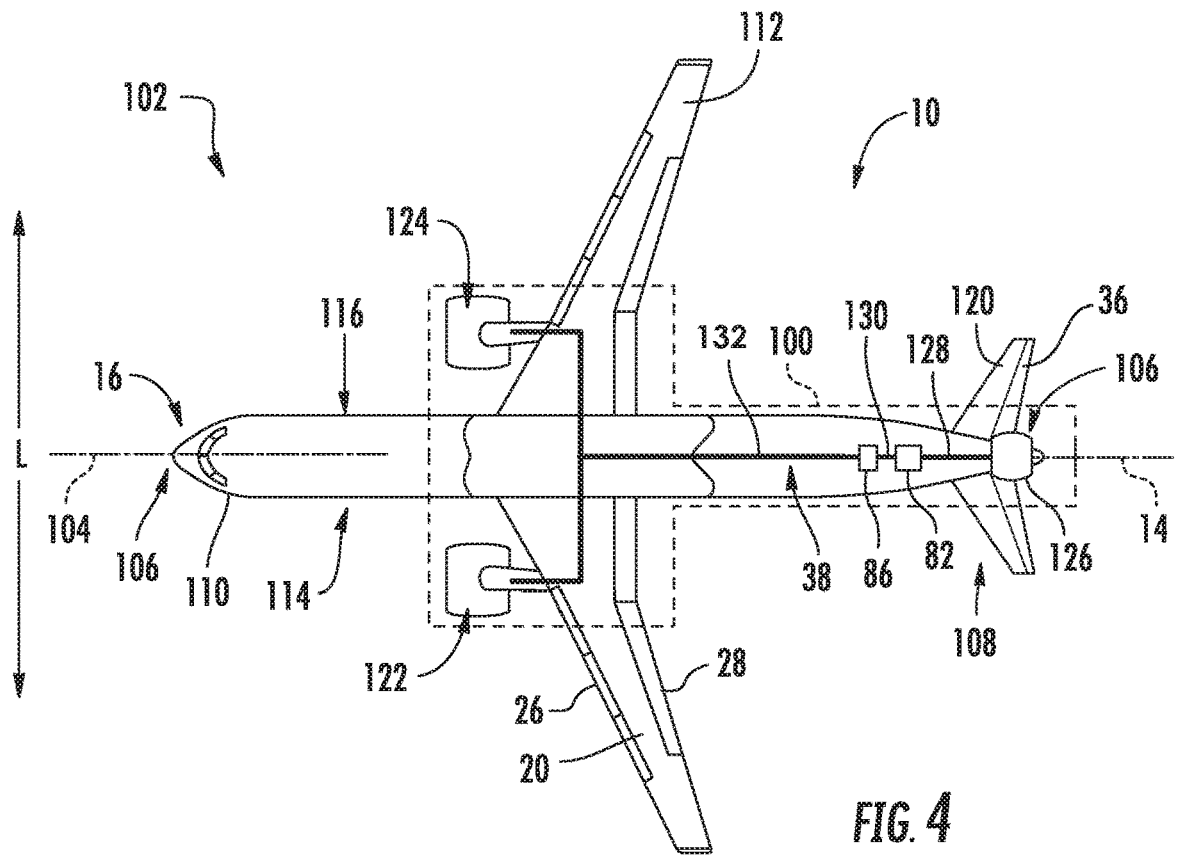
FIG. 4 is a top, schematic view of an aircraft incorporating an aeronautical propulsion system in accordance with an exemplary embodiment of the present disclosure.

As shown in FIG. 4, the aircraft 102 defines a longitudinal centerline 104 that extends therethrough, a forward end 106, and an aft end 108. Moreover, the aircraft 102 includes a fuselage 110, extending longitudinally from the forward end 106 of the aircraft 102 towards the aft end 108 of the aircraft 102, and a pair of wings 112. The first of such wings 112 extends laterally outwardly with respect to the longitudinal centerline 104 from a port side 114 of the fuselage 110 and the second of such wings 112 extends laterally outwardly with respect to the longitudinal centerline 104 from a starboard side 116 of the fuselage 110. The aircraft 102 further includes a vertical stabilizer (not shown) and a pair of horizontal stabilizers 120. It should be appreciated however, that in other exemplary embodiments of the present disclosure, the aircraft 102 may additionally or alternatively include any other suitable configuration of stabilizer.

The exemplary aeronautical propulsion system 100 of FIG. 4 includes a pair of gas turbine aircraft engines, at least one of which mounted to each of the pair of wings 112, and an aft engine. For the embodiment depicted, the gas turbine aircraft engines are configured as turbofan engines 122, 124 suspended beneath the wings 112 in an under-wing configuration—each turbofan engine 122, 124 including a fan and a turbine engine, also referred to as a core turbine engine (e.g., each of the turbofan engines 122, 124 may be configured in the same manner as the turbofan engine 10 of FIG. 1). Additionally, the aft engine may be configured as a fan 126, or more specifically for the embodiment depicted, as a boundary layer ingestion fan configured to ingest and consume air forming a boundary layer over the fuselage 110 of the aircraft 102. The exemplary fan 126 depicted is fixedly connected to the fuselage 110 at the aft end 108, such that the fan 126 is incorporated into or blended with a tail section at the aft end 108. Accordingly, the fan 126 may be referred to as an "aft fan." However, it should be appreciated that in various other embodiments, the fan 126 may alternatively be positioned at any suitable location of the aft end 108.

In addition to the turbofan engines 122, 124 and the fan 126, the aeronautical propulsion system 100 depicted includes an electric motor 82 mechanically coupled, i.e., drivingly coupled to the fan 126 (via a shaft 128) and a fuel cell 86 for providing electrical energy to the electric motor 82 (via an electrical line 130). The fuel cell 86 and electric motor 82 depicted in FIG. 4 may be configured in substantially the same manner as the exemplary fuel cell 86 and electric motor 82 described above with reference to FIG. 2. Accordingly, during operation of the aeronautical propulsion system 100, or more particularly, during operation of the fuel cell 86, the fuel cell 86 is configured to generate water as a byproduct. The aeronautical propulsion system 100 is configured to direct the water generated by the fuel cell 86 as a byproduct to one or both of the turbine engines of the turbofan engines 122, 124 via a water line 132. The aeronautical propulsion system may utilize such water to increase an efficiency of the aeronautical propulsion system by, e.g., cooling the turbine engines of the turbofan engines 122, 124.

An aeronautical portion system in accordance with one or more the above embodiments may be configured to generate thrust in a more efficient manner. More particularly, inclusion of one or more aspects of the present disclosure may allow for an aeronautical propulsion system to increase its efficiency by utilizing a fuel cell to efficiently generate electrical energy and an electric motor to convert such electrical energy to mechanical work for the propulsion system. Additionally, inclusion of one or more aspects of the present disclosure may allow for the aeronautical propulsion system to utilize the water generated by the fuel cell as a byproduct of its operation to further increase an efficiency of the propulsion system. For example, inclusion of one or more aspects of the present disclosure may allow the propulsion system to benefit from utilizing consumable water to cool certain aspects of the propulsion system (i.e., a turbine engine of the propulsion system) without requiring an aircraft into which the propulsion system is incorporated to carry a separate tank of water for such use—which may otherwise offset any efficiency gains by utilizing such water. Moreover, the inclusion of one or more aspects of the present disclosure into an ultra-high bypass, geared turbofan engine may result in a particularly high efficiency aeronautical propulsion system.

Figure 5:
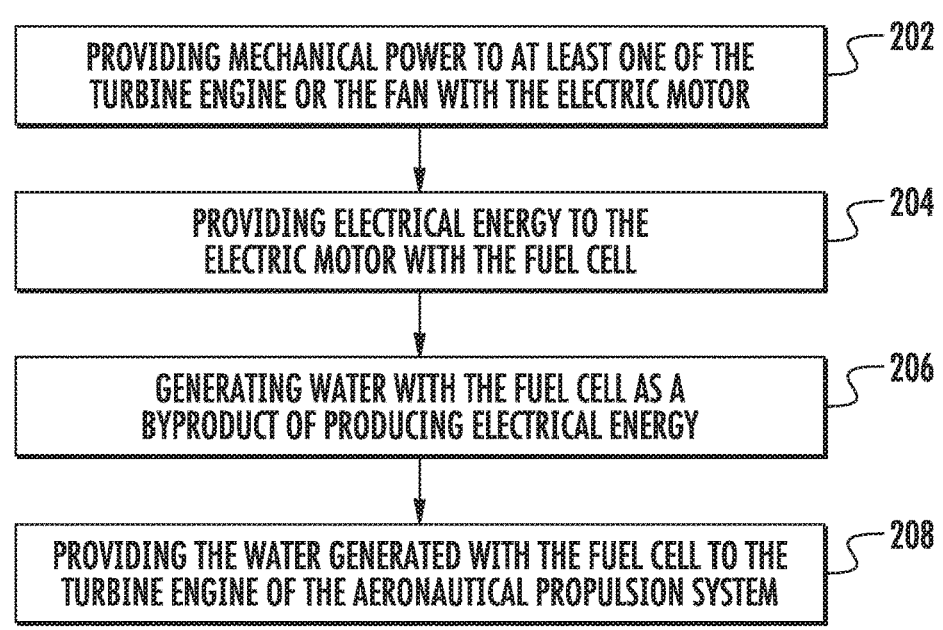
FIG. 5 is a flow diagram of a method for operating an aeronautical propulsion device in accordance with an exemplary aspect of the present disclosure.

Referring now to FIG. 5 a method (200) of operating an aeronautical propulsion system including a fan, a turbine engine, an electric motor, and a fuel cell is provided. The exemplary method (200) generally includes at (202) providing mechanical power to at least one of the turbine engine or the fan with the electric motor. Additionally, the exemplary method (200) includes at (204) providing electrical energy to the electric motor with the fuel cell, and at (206) generating water with the fuel cell as a byproduct of producing electrical energy.

Furthermore, the exemplary method (200) includes at (208) providing the water generated with the fuel cell at (206) to the turbine engine of the aeronautical propulsion system. The water provided to the turbine engine at (208) may be utilized to increase an efficiency of the turbine engine, e.g., by cooling one or more aspects of the turbine engine. For example, in certain exemplary aspects, the turbine engine may include a compressor section and providing the water generated with the fuel cell at (208) may include providing the water generated with the fuel cell to the compressor section of the turbine engine for intercooling the turbine engine. Specifically, the compressor section may include a first compressor and a second compressor located downstream of the first compressor. With such an aspect, providing the water generated with the fuel cell to the turbine engine at (208) may include providing the water generated with the fuel cell to a location between the first and second compressors. Additionally, or alternatively, in other exemplary aspects, turbine engine may additionally include a turbine section and the aeronautical propulsion system may be configured to provide the turbine section with cooling air from the compressor section. With such an exemplary aspect, providing the water generated with the fuel cell to the turbine engine at (208) may include providing/injecting the water generated with the fuel cell to the cooling air from the compressor section.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims. It will be appreciated, that when the definite article "said" is used in the claims prior to an element, such use is to differentiate claimed elements from environmental elements identified by the definite article "the" and not included within the claimed subject matter. Additionally, for claims not including the definite article "said", the definite article "the" is used to identify claimed elements.

What is claimed is:

1. A gas turbine engine comprising:
a core turbine engine including a compressor section, a combustion section, and a turbine section, wherein the compressor section includes a first compressor and a second compressor, the second compressor located downstream of the first compressor, and wherein the compressor section, the combustion section, and the turbine section together define at least in part a core air flowpath;
a fan mechanically coupled via a fan gearbox to the core turbine engine;
an electric motor mechanically coupled to at least one of the core turbine engine via a power gearbox and the fan via the fan gearbox, the fan gearbox located upstream of the power gearbox, and the power gearbox directly mechanically coupled to a core turbine engine shaft; and
a fuel cell for providing electrical energy to the electric motor, the fuel cell generating water as a byproduct, the gas turbine engine directing the water generated by the fuel cell to the core air flowpath of the core turbine engine at a location between the first compressor and the second compressor.

2. The gas turbine engine of claim 1, wherein the gas turbine engine is further configured to direct the water generated by the fuel cell to the core turbine engine for intercooling the core turbine engine.

3. The gas turbine engine of claim 1, wherein the electric motor is mechanically coupled to the core turbine engine via the power gearbox.

4. The gas turbine engine of claim 1, wherein the electric motor is mechanically coupled to the fan through the fan gearbox.

5. The gas turbine engine of claim 1, wherein the fuel cell utilizes a hydrogen fuel.

6. The gas turbine engine of claim 1, further comprising:
a reformer located upstream of the fuel cell for producing a hydrogen fuel for the fuel cell.

7. The gas turbine engine of claim 1, wherein the core turbine engine is mechanically coupled to the fan gearbox through the power gearbox.

8. The gas turbine engine of claim 1, wherein the gas turbine engine is configured to inject the water generated by the fuel cell directly into the core air flowpath between the first compressor and the second compressor to reduce a temperature of an airflow therethrough.

9. The gas turbine engine of claim 1, wherein the core turbine engine is supplied fuel from a first flow of fuel from a fuel tank and the fuel cell is supplied fuel via a reformer from a second flow of fuel from the fuel tank.

10. The gas turbine engine of claim 1, wherein the fuel cell is supplied fuel via a reformer from a flow of fuel from a fuel tank and is supplied air from a bypass passage of the gas turbine engine.

11. An aeronautical propulsion system including a turbine engine, the turbine engine including a compressor section, a combustion section, and a turbine section and defining a core air flowpath, the compressor section including a first compressor and a second compressor, the second compressor located downstream of the first compressor, the system comprising:
- a fan coupled to the turbine engine via a fan gearbox, the fan gearbox upstream of a power gearbox, and the power gearbox directly mechanically coupled to a turbine engine shaft;
- an electric motor drivingly coupled to said fan via the fan gearbox; and
- a fuel cell for providing electrical energy to said electric motor, said fuel cell generating water as a byproduct, the aeronautical propulsion system directing the water generated by said fuel cell to the core air flowpath of the turbine engine at a location between the first compressor and the second compressor.

12. The system of claim 11, wherein the power gearbox is located upstream of the turbine engine.

13. The system of claim 11, wherein said fuel cell utilizes a hydrogen fuel.

14. The system of claim 11, further comprising
- a reformer located upstream of said fuel cell for producing a hydrogen fuel for said fuel cell.

15. The system of claim 11, wherein the turbine engine is suppled fuel from a first flow of fuel from a fuel tank and the fuel cell is supplied fuel via a reformer from a second flow of fuel from the fuel tank.

16. A method of operating an aeronautical propulsion system including a fan, a turbine engine, an electric motor, and a fuel cell, the method comprising:
- providing mechanical power to at least one of the turbine engine or the fan with the electric motor coupled to the at least one of the turbine engine via a power gearbox or the fan via a fan gearbox, the fan gearbox upstream of the power gearbox, and the power gearbox directly mechanically coupled to a turbine engine shaft;
- providing electrical energy to the electric motor with the fuel cell;
- generating water with the fuel cell as a byproduct of producing electrical energy; and
- providing the water generated with the fuel cell to the turbine engine of the aeronautical propulsion system, wherein providing the water generated with the fuel cell to the turbine engine of the aeronautical propulsion system comprises providing the water generated with the fuel cell to a core air flowpath of the turbine engine at a location between a first compressor and a second compressor of a compressor section of the turbine engine.

17. The method of claim 16, wherein providing the water generated with the fuel cell to the turbine engine further comprises providing the water generated with the fuel cell to the compressor section of the turbine engine for intercooling the turbine engine.

18. The method of claim 16, wherein the electric motor is mechanically coupled to the fan.

19. The method of claim 16, wherein the fuel cell utilizes a hydrogen fuel.

20. The method of claim 16, wherein generating water with the fuel cell as a byproduct of producing electrical energy is through fuel supplied to the fuel cell via a reformer from a flow of fuel from a fuel tank and through air supplied to the fuel cell from a bypass passage of the gas turbine engine.

* * * * *